Jan. 19, 1932.　　　R. W. STANLEY　　　1,841,853
VENEER CLIPPING MACHINE
Filed Feb. 18, 1929　　　4 Sheets-Sheet 1
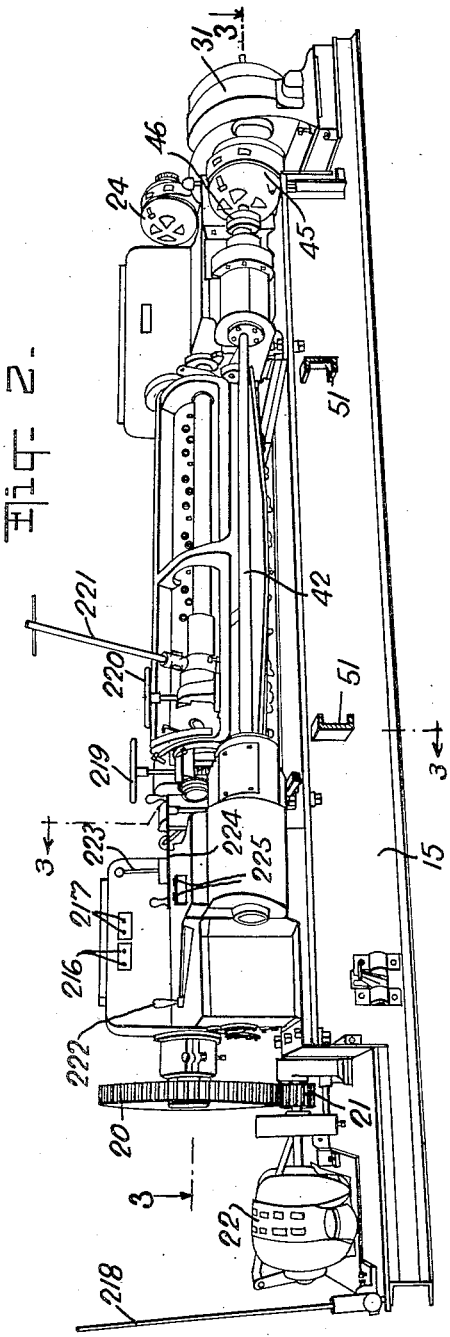
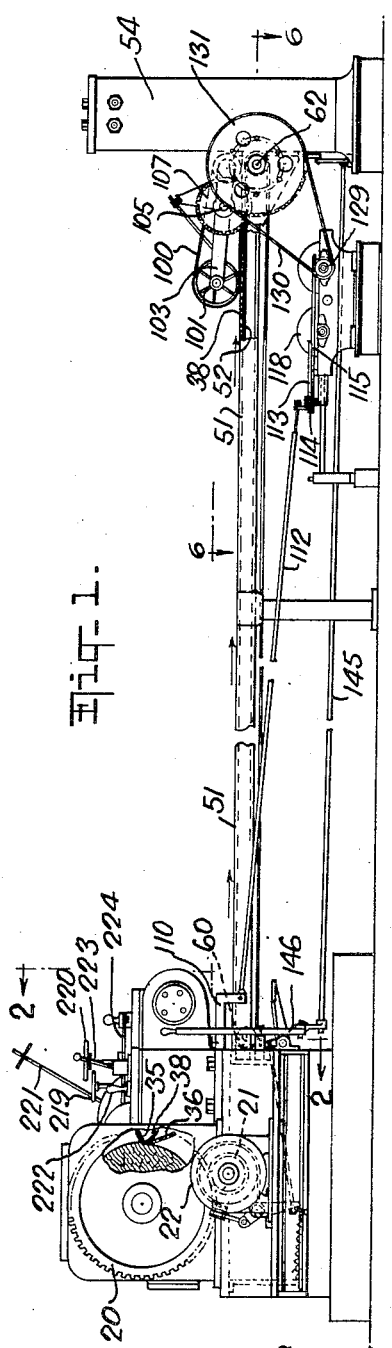
Inventor
Richard W. Stanley
By Attorney
Warfield & Watson Jan. 19, 1932.   R. W. STANLEY   1,841,853
VENEER CLIPPING MACHINE
Filed Feb. 18, 1929   4 Sheets-Sheet 2
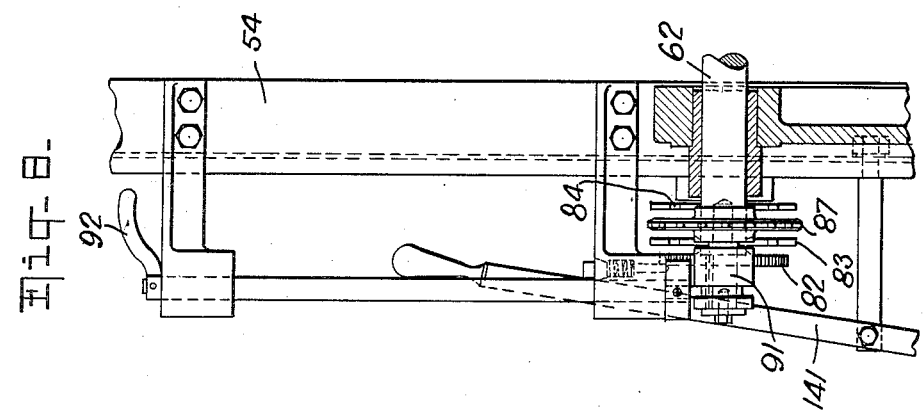
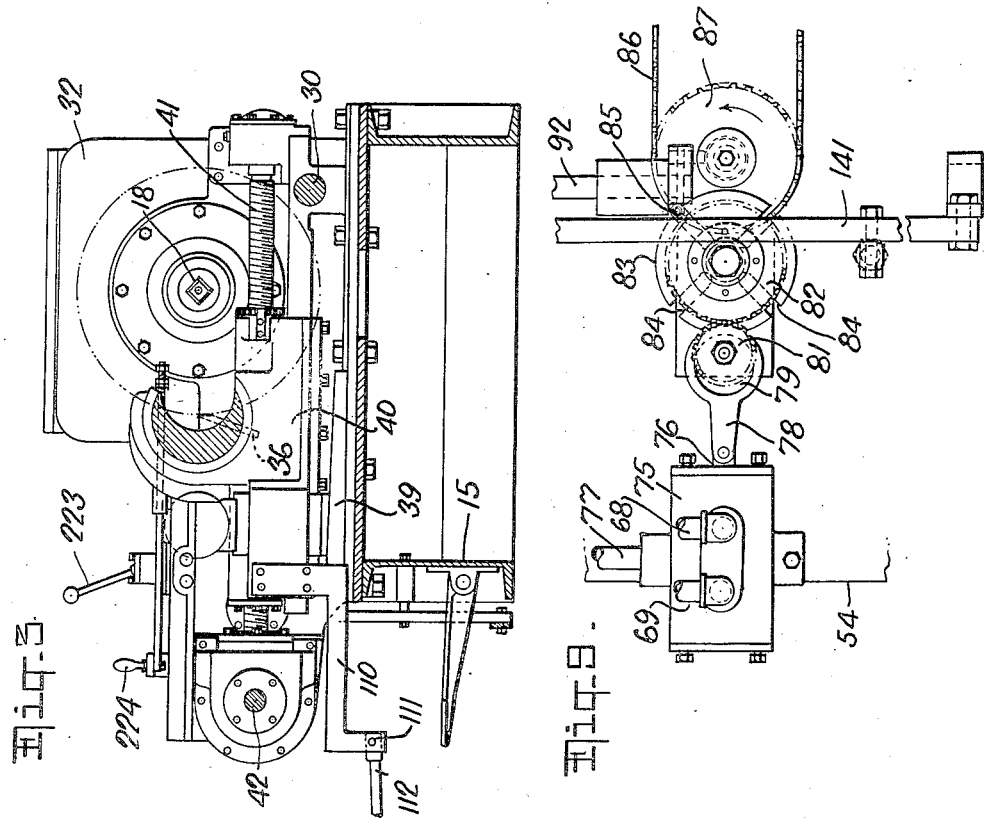
Inventor
Richard W. Stanley
By Attorney
Warfield & Watson

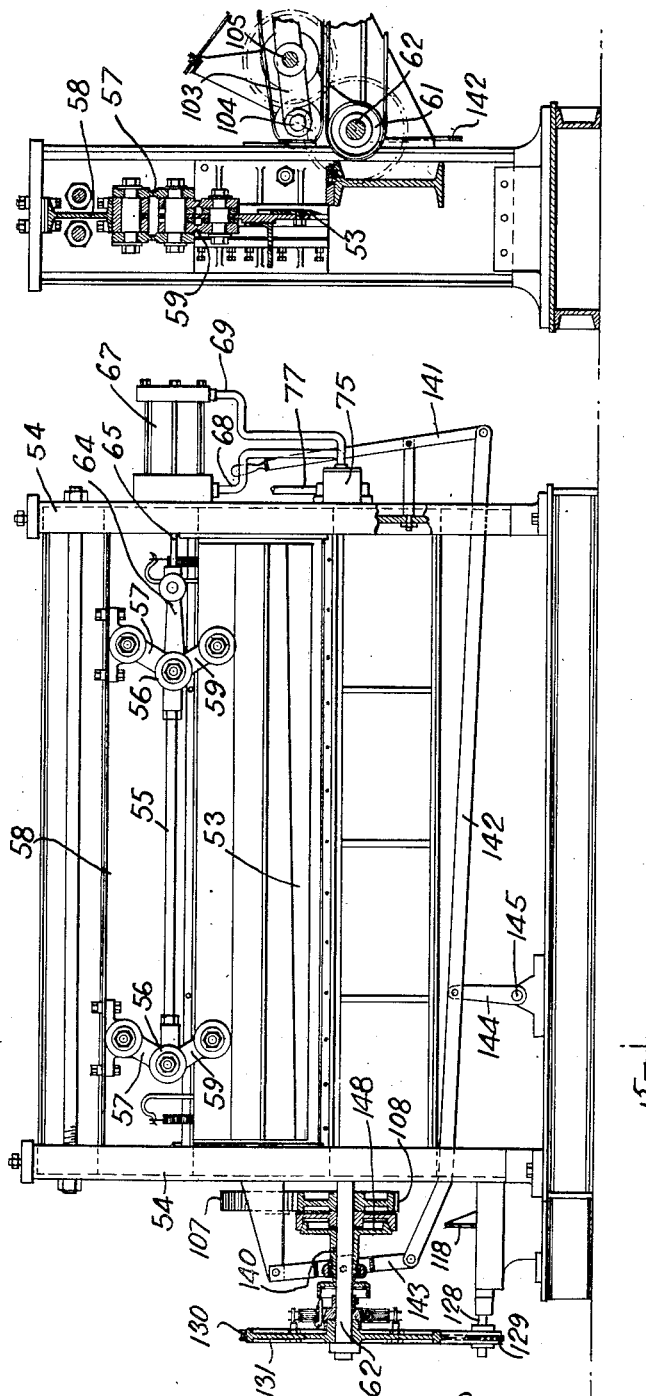

Jan. 19, 1932.  R. W. STANLEY  1,841,853
VENEER CLIPPING MACHINE
Filed Feb. 18, 1929   4 Sheets-Sheet 4
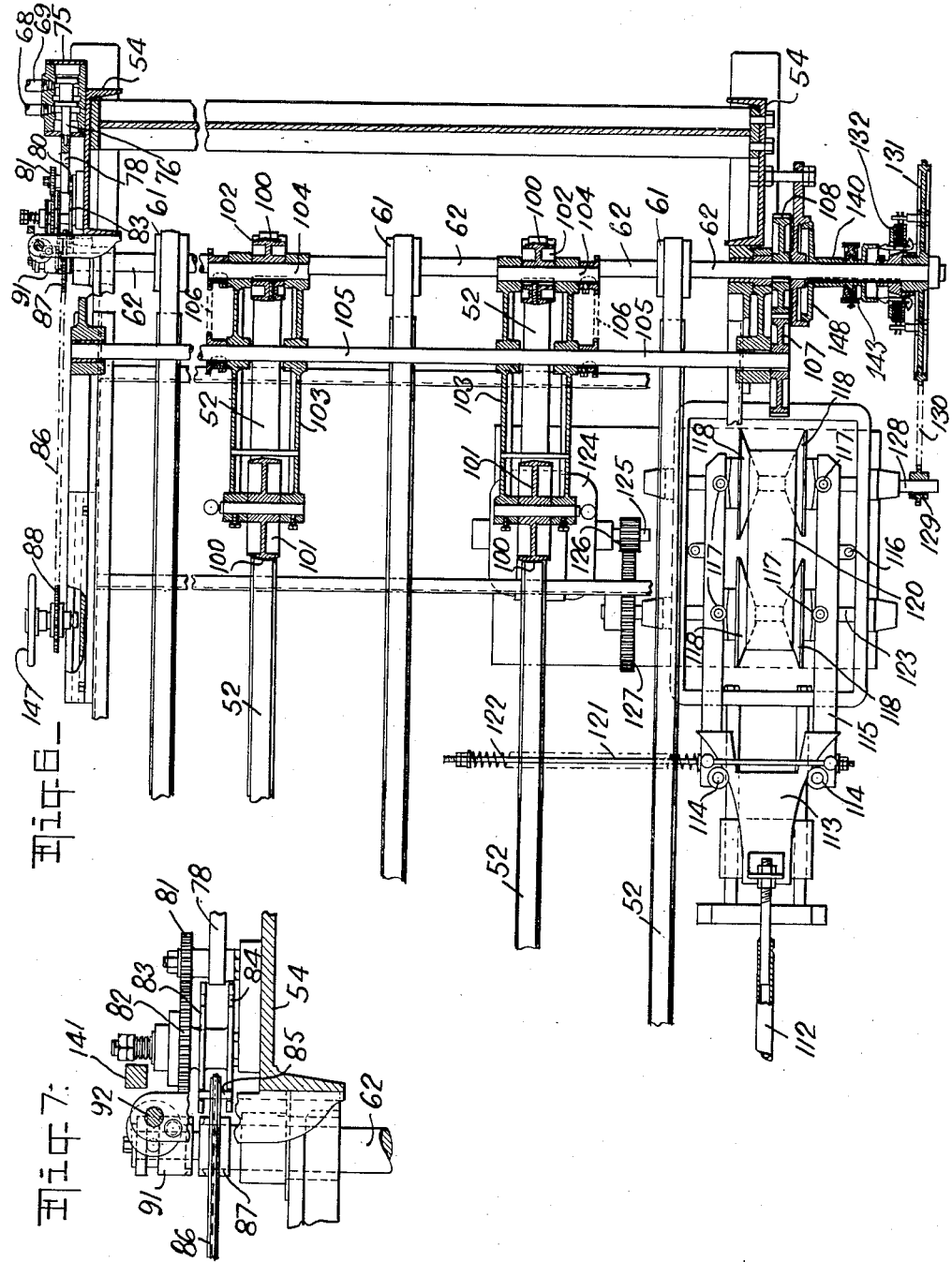

Patented Jan. 19, 1932

1,841,853

UNITED STATES PATENT OFFICE

RICHARD W. STANLEY, OF LOCKPORT, NEW YORK, ASSIGNOR TO MERRITT ENGINEERING & SALES COMPANY, INC., OF LOCKPORT, NEW YORK, A CORPORATION OF NEW YORK

VENEER CLIPPING MACHINE

Application filed February 18, 1929, Serial No. 340,761, and in Russia October 6, 1928.

This invention relates to veneer clipping machines and to correlated improvements and discoveries, wherewith and whereby the operation of the same may be enhanced.

In general, it is an object of the invention to provide a machine of the character described which is simple and permanent in construction, easy and economical to manufacture and assemble, and speedy and efficient in operation.

Another object is to provide a machine which is especially simple and compact in construction and in which the likelihood of delays is minimized.

Another object is to provide a veneer clipper which operates with especial speed and accuracy, which may be easily and positively controlled and which will slow up the operation of the associated lathe to the minimum extent.

Other objects of the invention will in part be obvious and will in part appear hereinafter.

The invention accordingly comprises the features of construction, combinations of elements, and arrangement of parts, which will be exemplified in the constructions hereinafter set forth and the scope of the application of which will be indicated in the claims.

For a fuller understanding of the nature and objects of the invention reference should be had to the following detailed description taken in connection with the accompanying drawings, in which:

Figure 1 is a side view of a machine constructed in accordance with the invention;

Fig. 2 is a perspective view of the lathe, viewed with the remainder of the machine cut away, along the lines 2—2 in Figure 1;

Fig. 3 is a vertical section of the lathe taken in the direction of the arrows along the lines 3—3 in Fig. 2;

Fig. 4 is an end view of the clipper unit and mechanism associated therewith;

Fig. 5 is a section taken in the direction of the arrows along the line 5—5 in Fig. 4;

Fig. 6 is a horizontal section taken in the direction of the arrows along the line 6—6 in Fig. 1;

Fig. 7 is an enlarged detail showing the Geneva wheel and the manual control release clutch as viewed from the top;

Fig. 8 is an enlarged detail showing the Geneva wheel and the release clutch as viewed from the left of Fig. 7; and Fig. 9 is an enlarged detail showing the operating mechanism for the clipper-control fluid pressure valve, as viewed from the side.

The invention contemplates the provision of an improved machine for stripping sheets of material from a rotating block or log and for clipping the same into short lengths, which machine is of such nature that it may be operated with efficiency and safety at particularly high speeds and with a minimum of attention.

While the invention is directed to machines for accomplishing a variety of results, it finds its primary application in veneer-stripping and clipping machines and is exemplified as embodied in such a machine. In the exemplified machine, moreover, the invention is illustrated as used in connection with a machine such as disclosed in the co-pending application of Ericsson H. Merritt, Serial No. 341,017, filed herewith.

For the sake of facility of expression the term "veneer" is used herein to indicate any sheet of material stripped from a block or log; the term "log" is used to indicate any block or like member from which sheets of material are to be stripped; and it is to be understood that these and other expressions used are not employed in any restricted or particular sense.

In the exemplified machine the veneer lathe shown in Figs. 2 and 3, together with its associated parts, is mounted on a frame piece 15. The machine may be equipped with a pair of log-rotating spindles each equipped at its inner end with a log holding clamp 18, and provided at its outer end with a screw thread which may be operated for dogging the clamp into engagement with the end of the log by any suitable means from any desired source of power. In the present instance, one screw spindle may be operated through the medium of a gear train 20—21 from a motor 22, and the other screw spindle may be operated from a motor 24. A main driving motor 31 is also provided.

Mechanism of any well known or suitable type may be provided in order to strip the veneer from a log which is clamped between the spindles and rotated thereby. In Fig. 1 there is exemplified a pressure bar 35 and a knife 36 between which veneer sheet 38 is extruded. The lathe knife and pressure bar are suitably mounted upon a transversely movable knife carriage 40 (Fig. 3) riding on ways 39, the knife and the pressure bar preferably being provided with suitable adjusting means, as is known practice. In order to move the carriage 40 toward the center of the log during the veneer stripping operation and in order to rapidly position the knife for stripping veneer from a new log, there are provided a pair of worms 41 which are operatively connected with a shaft 42 by means of gears 43 and 44. To withdraw the knife to permit a log to be inserted the shaft 42 is rotated in one direction by a motor 45 to which the shaft is connected by means of a clutch 46, and to move the knife against a log the shaft 42 is rotated in the other direction. When, however, the lathe knife is to be thrust regularly into the log to strip the veneer, the shaft 42 is operated from the sleeve 26 by means of suitable connections, which preferably include selective gearing or other multiple speed transmission means whereby the thickness of the sheet of veneer may be suitably regulated.

In order to facilitate operation of the machine and to avoid delays in operation, the controls for the various operating elements are all assembled within easy reach of a lathe operator standing at the left-hand of the veneer side of the lathe (Fig. 2). These controls comprise two-way push buttons 216 for controlling the operation of the motor 22; two-way push buttons 217 for controlling the operation of the motor 24; a lever 218 for operating the clutch 193 which operatively connects the motor 31 with the main drive shaft 30; a wheel 219 for adjusting the pitch of the lathe knife; a wheel 220 for adjusting the pitch of the pressure bar; a lever 221 for tilting the pressure bar out of operative position; a tumbler 222 mounted on a frame 205 for operating the tumbler gear 204, a lever 223 for the feed ratio control mechanism associated with the shafts 207 and 211; a lever 224 for operating the clutch 49, and two-way push buttons 225 for controlling the operation of the motor 45.

In order to secure against the movement of the push buttons 225 when the clutch 49 is thrown in, lever 224 is adapted to extend over the buttons 225 when the clutch 49 is engaged.

From the lathe the veneer sheet extends over a platform 51 on a suitable bed such as provided by the moving belts 52 to a clipper unit, such, for example, as the unit shown in Figs. 4 and 5 which comprises a clipper knife 53 slidable in suitable ways in uprights 54.

In order to provide for an especially fast operation of the clipper knife whereby the clipper may be adapted to cut into particularly short lengths a sheet of veneer coming at relatively fast speed from the lathe, and in order to avoid the vibration which often results at the upper end of the stroke during the use of certain types of clippers, the present invention contemplates the provision of means for imparting a down-and-up movement to the knife in response to a one-way movement of an actuating member. In the present instance toggles are provided. A plunger 55 carries a pair of toggle joints 56 each having upper toggle links 57 pivotally connected to a cross-bar 58, and lower toggle links 59 pivotally connected with the clipper 53.

The sheet of veneer is carried past the clipper by the belts 52 which extend about free rollers 60 (Fig. 1), mounted adjacent the lathe, and operating rollers 61 (Fig. 6), mounted on a rotatable shaft 62. By the use of a clipper operating arrangement such as described, a sufficiently speedy operation is provided so that the veneer will pass substantially continuously under the clipper, the delay in movement during the cutting operation being insufficient to cause any substantial buckling of the sheet. Furthermore, this arrangement eliminates the possibility of the clipper being in a downward position across the path of the veneer sheet, when the operation of the clipper is stopped for any reason, since, at a completion of either stroke of the plunger, the clipper knife will be in an upward position.

Various means for actuating the operating element, such as the plunger 55, may, of course, be employed; but it is preferable to use fluid pressure means for the purpose of securing the desired speed and accuracy of operation. To this end, the plunger 55 is connected by means of a link 64 to the stem 65 of a two-way piston operating in a fluid pressure chamber 67, from the opposite ends of which there extend fluid pressure conduits 68 and 69, through which compressed air, steam or other desired fluid may be introduced into the chambers for operating the piston. The conduits 68 and 69 lead, in the present instance, to a control chamber 75 in which there reciprocates a plunger 76 arranged to act as a two-way valve whereby the operating fluid which enters the chamber 75 through an inlet conduit 77 may be directed either to the conduit 68 or to the conduit 69. The plunger 76 is actuated by a pivoted link 78, the free forked end of which embraces an eccentric 79, carried on the shaft 80 of a pinion 81. The pinion 81 meshes with the gear 82, rotated by a "Geneva" wheel 83, provided with four radial slots 84. The Geneva wheel is operated by a pin 85 carried on a sprocket chain 86 extending over sprocket wheels 87 and 88. In order to permit the timing of the fluid pressure control valve 75 to be adjusted, at will, an adjustable length chain is employed and wheel 88 is adjustably mounted with respect to the wheel 87. When the clipper is to be operated automatically, the wheel 87 is suitably connected with a source of power. In the present instance it is adapted to be connected to the shaft 62 (which carries the pulley wheel 61 for the belt 52) by means of a clutch 91 operated by a control 92, the provision of the clutch making it possible to disconnect the wheel 87 from the shaft 62, when desired. Thus the operator, by turning the control 92, may slide the clutch 91 outwardly so that the rotation of the shaft 62 will not be transmitted to the wheel 87 and so that when the shaft 162 is for any reason locked against movement, the wheel 87 will nevertheless be free to turn. The provision of this clutch thus permits the valve mechanism 75, which controls the clipper operation to be actuated manually by the turning of a hand-wheel 147 which turns the sprocket 88 to operate the mechanism when the clutch is thrown out. In Fig. 6 the clutch 91 is shown in operative position for rotating the wheel 87 with the shaft 62 and in Figs. 7 and 8 it is shown in inoperative position.

In order to prevent the veneer from buckling after it approaches the clipper, there are provided a plurality of belts 100 each extending between a free roller 101 and an operating roller 102. Each roller 102 is mounted on a shaft 104 which is operatively connected with a shaft 105 by suitable means such as the sprocket chain 106. The shaft 105 carries a gear 107 which meshes with a gear 108 keyed to the shaft 62. As will be apparent the weight of the rollers causes the belts 100 to bear down upon the sheet of veneer and to press the same against the belt 52 so that the veneer sheet is maintained flat at this point and any buckling which might occur would be at a point sufficiently removed from the clipper so as not to interfere with the steady feed of the sheet to the clipper.

Suitable means are provided for driving the shaft 62. The exemplified means includes a variable speed mechanism operatively connected with the lathe knife carriage, such as set forth in the aforesaid application of Ericsson H. Merritt, Ser. No. 341,017, filed herewith, whereby the speed of the conveyor belts and the speed of operation of the clipper knife can be synchronized with the varying speed at which the veneer leaves the log as the lathe knife approaches the center of the log. The exemplified mechanism comprises a bracket 110 mounted on the lathe knife carriage and movable therewith. To this bracket there is pivotally connected at 111 a rod 112 on the end of which the cam member 113 of a variable speed mechanism is carried. Against the opposite cam surfaces of the cam member 113 there rest a pair of rollers 114, each roller being mounted on a bar 115, pivoted at 116, and carrying a pair of members 117 against each of which there rests a conical member 118. Between the two pairs of conical members thus provided, there extends a belt 120. The ends of the arms 115 nearest the lathe are connected by a bar 121 carrying a spring 122, which serves to press these ends of the arms 115 together, and to press the rollers 114 against the cam surfaces of the member 113. The pair of conical members 118 nearest to the cam member 113 are slidably keyed on a shaft 123, which is rotated by a suitable source of power such as a motor 124 through the medium of a shaft 125 and gears 126 and 127. The pair of conical members 118 farthest from the cam member 113 are slidably keyed on a shaft 128, carrying a sprocket wheel 129 from which a sprocket chain 130 extends to a sprocket wheel 131. The wheel 131 is adapted to be connected to the shaft 62 by a suitable clutch 132 operated by a sleeve 140, which is adapted to be slid on the shaft 62 by means of a lever 141 through the medium of links 142 and 143. If desired, suitable means, such the link 144, the shaft 145 and the lever 146, may be provided for permitting the operation of the clutch-controlling sleeve by the lathe operator. Thus the speed of rotation of the shaft 62, which controls the speed of operation of the clipper knife 53 and of the belts 52, is controlled in accordance with the position of the lathe knife with respect to the log, claims to this feature being included in said copending application of Ericsson H. Merritt.

While the exemplified means for automatically operating the shaft 62 includes variable speed mechanism, it is to be understood that the shaft 62 may be operated directly from any suitable source of power, when desired.

The present invention provides a clipper which can be operated automatically at a high speed and in a highly efficient manner, and it is ordinarily so used. Often, however, because of defects which must be cut out of the sheet of veneer, or for other reasons, such as the desirability of clipping the sheet into unusual lengths, such automatic clipping is wasteful or ineffectual; and there is accordingly provided manual means for operating the clipper, such means consisting, in the present instance, of the hand wheel 147 for rotating the sprocket wheel 88. As will be seen from Fig. 6, a brake 148 mounted on the sleeve 140 is provided so as to prevent the momentum of the belts 52 and the members associated therewith from carrying the sheet of veneer forward after the clutch 132 is thrown out. Subject matter divided out of this application is included in the application of Richard W. Stanley, Serial No. 458,757, filed May 31, 1930.

Since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic features of the invention herein described, and all statements of the scope of the invention which as a matter of language might be said to fall therebetween.

Having described my invention, what I claim as new and desire to secure by Letters Patent is:

1. In a veneer clipping machine, the combination of a clipper knife, means to move a sheet of veneer past said clipper knife, fluid pressure operated means for operating said knife during the movement of the veneer, and automatic means for controlling the actuation of said fluid pressure operated means.

2. In a veneer clipping machine, the combination of a clipper knife, means to move a sheet of veneer past said clipper knife, fluid pressure operated means for operating said knife during the movement of the veneer, automatic means for controlling the actuation of said fluid pressure operated means, and means for adjusting the timing of said automatic means.

3. In a veneer clipping machine, the combination of a clipper knife, fluid pressure operated means for operating said knife, means for automatically operating said fluid pressure operated means, means for disconnecting said automatic means, and means for manually operating said fluid pressure operated means when said automatic means is disconnected.

4. In a veneer clipping machine, the combination of a clipper knife, means for automatically operating the clipper knife, means including an adjustable element for controlling the timing of said operating means, and means for manually operating the clipper, the last-mentioned means including said controlling means and an actuating member adjustable with said adjustable element.

5. In a veneer clipping machine, the combination of a clipper knife, means for initiating the operation of said knife, continuously operable means to move a strip of veneer past said clipper knife, means for causing the knife to complete a cycle of operation when the same has been initiated, automatic means for actuating said initiating means, and manually operable means for actuating said initiating means, said continuously-operable means being arranged for operation during the operation of said knife.

6. In a veneer clipping machine, the combination of a clipper, a conveyor adapted to carry a sheet of material to the clipper, means for operating said conveyor, clipper-operating means operable in response to the operation of said conveyor-operating means, means for disconnecting said conveyor-operating means, and a brake associated with said disconnecting means for halting the movement of said conveyor immediately upon the operation of said disconnecting means.

7. In a veneer clipping machine, the combination of a clipper, a conveyor extending to said clipper, a clipper-operating shaft, means for operating said conveyor in response to the operation of said clipper-operating shaft, driving means adapted to rotate said shaft, a clutch adapted to connect said shaft with said driving means, a brake adapted to halt the operation of said shaft, an operating sleeve mounted on said shaft, said clutch and said brake each being carried by said sleeve, and means for moving said sleeve to throw out said clutch and throw in said brake.

8. In a veneer clipping machine, a clipper knife, fluid pressure operated means for operating said clipper knife, means to control the operation of said fluid pressure operated means, means to feed a sheet of material to the clipper, and means to simultaneously render said control means and said feeding means inoperative, said rendering means comprising a brake whereby the operation of said feeding means is positively halted.

9. In a veneer clipping machine, the combination of a clipper knife, fluid pressure operated means for operating said knife, continuously operable means to feed a sheet of material across the path of said knife, and automatic means for controlling the actuation of said fluid pressure operated means in response to the speed of operation of said feeding means, said operating means being adapted to operate said knife during the operation of said feeding means.

10. In a veneer clipping machine, the combination of a reciprocable clipper knife, a conveyor, means to operate said conveyor to feed a sheet of material across the path of operation of the clipper knife, knife-operating means adapted to be controlled by the conveyor-operating means and adapted automatically to impart to said clipper knife during the operation of said conveyor a succession of forward movements, each of which is followed immediately by a retractive movement.

11. In a veneer clipping machine, the combination of a clipper knife, means to feed a strip of material to said knife, continuously operable driving means for said feeding means, fluid-pressure operated means for operating said clipper knife, mechanism operated by said driving means for periodically actuating said fluid-pressure operated means during the movement of said feeding means, means to halt the operation of said driving means, and means to disconnect said actuating mechanism from said driving means, and independent means for operating said mechanism.

12. In a veneer clipping machine, the combination of a clipper knife, means for continuously feeding a strip of material to said clipper knife, and means to cause a cutting action by said clipper knife during the operation of said feeding means and immediately and positively to cause a retractive movement of the knife, said causing means including a member in response to a uni-directional movement of which a forward and retractive movement of the knife occurs.

13. In a veneer clipping machine, the combination of a clipper knife, means for continuously feeding a strip of material to said clipper knife, means to cause a cutting action by said clipper knife during the operation of said feeding means and immediately and positively to cause a retractive movement of the knife, said causing means comprising a plunger, means to cause a forward and retractive movement of the knife in response to a one-way movement of the plunger, and fluid-pressure operated means for actuating said plunger in both directions.

14. In a veneer clipping machine, the combination of a clipper knife, means for continuously feeding a strip of material to said clipper knife, and means to cause a cutting action by said clipper knife during the operation of said feeding means and immediately and positively to cause a retractive movement of the knife, said causing means including a fluid pressure operated means arranged for operation under control of said feeding means including also a member in response to a uni-directional movement of which a forward and retractive movement of the knife occurs.

15. In a veneer clipping machine, the combination of a clipper knife, means for continuously feeding a strip of material to said clipper knife, and means to cause a cutting action by said clipper knife during the operation of said feeding means and immediately and positively to cause a retractive movement of the knife, said causing means comprising a plunger and toggle connections between said plunger and said knife, said toggle connections being arranged to cause a forward and retractive movement of said knife in response to a one-way movement of said plunger.

16. In a veneer clipping machine, the combination of a cutter member, means for continuously feeding a strip of material to said cutter member and means for utilizing a single charge of fluid pressure to force said cutter member into cutting position and immediately thereafter to force the same away from cutting position.

In testimony whereof I affix my signature.

RICHARD W. STANLEY.